United States Patent
Heflinger et al.

(12)

(10) Patent No.: US 6,243,515 B1
(45) Date of Patent: Jun. 5, 2001

(54) APPARATUS FOR OPTICALLY PUMPING AN OPTICAL FIBER FROM THE SIDE

(75) Inventors: Donald G. Heflinger, Torrance; Michael G. Wickham, Rancho Palos Verdes; Gerald W. Holleman, Manhattan Beach, all of CA (US)

(73) Assignee: TRW Inc., Redondo Beach, CA (US)

(*) Notice: Subject to any disclaimer, the term of this patent is extended or adjusted under 35 U.S.C. 154(b) by 0 days.

(21) Appl. No.: 09/336,656

(22) Filed: Jun. 18, 1999

(51) Int. Cl.[7] ........................................... G02B 6/34
(52) U.S. Cl. ............................ 385/37; 385/32; 385/88
(58) Field of Search ................................ 385/37, 32, 24, 385/88; 372/6

(56) References Cited

U.S. PATENT DOCUMENTS

| 5,061,032 | 10/1991 | Meltz et al. | |
|---|---|---|---|
| 5,187,760 | * 2/1993 | Huber | 385/37 |
| 5,511,083 | * 4/1996 | D'Amato et al. | 372/6 |
| 6,052,394 | * 4/2000 | Leee et al. | 372/6 |

OTHER PUBLICATIONS

T. Weber, W. Luthy, H. Weber, "Side–Pumped Fiber Laser", Applied Phys. B, vol. 63, 131–134 (1996).
L. Goldberg, B. Cole, E. Snitzer, "V–Groove Side–Pumped 1.5um Fiber Amplifier", Elect. Lett., vol. 33, 2127–2129 (1997).

* cited by examiner

*Primary Examiner*—Hung N. Ngo
(74) *Attorney, Agent, or Firm*—Robert W. Keller

(57) ABSTRACT

An apparatus for optically pumping an optical fiber from the side comprising a laser for supplying a beam of pump light, and an optical fiber having a longitudinal surface disposed to the beam, a grating formed in the flat surface for diffracting the beam at a predetermined angle, and an outer clad layer proximate the grating and so as to establish at least one propagating mode characterized by an angle, the predetermined angle being matched to such angle.

26 Claims, 3 Drawing Sheets

APPARATUS FOR OPTICALLY PUMPING AN OPTICAL FIBER FROM THE SIDE

BACKGROUND OF THE INVENTION

1. Field of the Invention

The present invention relates generally to an apparatus for side pumping an optical fiber, and, more particularly, to an apparatus for optically pumping an optical fiber from the side that comprises a grating formed on a multimode fiber.

2. Description of the Prior Art

Fiber amplifiers and fiber lasers require high optical pump levels to be injected within the region of the fiber that includes the active medium that provides the optical gain. Presently, the output power from fiber amplifiers and fiber lasers is limited by the amount of optical power that can be injected into the active medium of the fiber. This limitation stems from the approaches that have been used in the past to couple optical pump power into the fiber.

In the case of single-mode doped fiber, wavelength division multiplexing (WDM) couplers are typically used. This requires that the path of the doped fiber be interrupted to provide for a section of fiber to connect to the WDM coupler. Such an interruption complicates the pumping process.

In the case of dual clad doped fiber, a common approach for injecting optical pump power is end pumping. End pumping provides at most only two input ends through which all the injected optical pump power enters the fiber. This physically constrains the number and type of pump sources that are able to be used to inject the optical power. Such a constraint has led to the development of optical side pumping techniques for dual clad doped fiber in which the entire length of the fiber is made available to couple in a much greater number and type of optical pump sources.

Accordingly, side coupling pump light into a doped fiber has been performed in the past. As previously described, the use of WDM allows pump light having a different wavelength from that which is to be amplified to be coupled into the doped fiber at any point along the fiber provided that an interruption is made for the WDM coupler in the doped fiber. The WDM coupler is designed so that pump light is sent into one of the two input fibers and the light to be amplified is sent into the other input fiber. The interaction length between the two closely coupled fibers is precisely selected to enable the pump light to be completely coupled to the fiber with the light to be amplified while the light to be amplified remains in the same fiber. This is relatively complex.

A second method for side coupling pump light is to cut V-grooves into the cladding of dual clad doped fiber. The V-grooves bounce the side-coupled light into a mode of propagation along the fiber. The cutting of the V-grooves, however, generally weakens the fiber.

A third approach for side pumping is to couple light through a prism into a dual clad doped fiber by precisely locating the prism against an exposed cladding interface. This exact positioning, however, is difficult to achieve.

It also should be recognized that gratings have been employed in doped fibers to Bragg diffract the propagating light either back onto itself or to couple the propagating light out of the fiber. But a grating had not been used to couple optical pump light into a fiber to enable amplification or laser action on light at another wavelength.

What is needed, therefore, is an apparatus for optically pumping an optical fiber from the side which comprises a grating formed on a multimode fiber which diffracts a beam of pump light at an angle that is matched to the angle characterizing a propagating mode and that is relatively simple to construct.

SUMMARY OF THE INVENTION

The preceding and other shortcomings of the prior art are addressed and overcome by the present invention which provides an apparatus for optically pumping an optical fiber from the side. The apparatus comprises a laser for supplying a beam of pump light, an optical fiber, and a grating to allow diffractive coupling of the pump light into the fiber. The optical fiber includes a multimode fiber having a longitudinal surface disposed in the beam of the pump light with at least one propagating mode characterized by a propagation angle. The grating is formed on the longitudinal surface for diffracting the beam of pump light at a predetermined angle that matches the propagation angle.

In another aspect of the invention many pump sources and grating are employed along the optical fiber.

BRIEF DESCRIPTION OF THE DRAWINGS

Reference is now made to the detailed description of the invention illustrated in the accompanying drawings, in which.

DETAILED DESCRIPTION OF THE INVENTION

Figure 1:
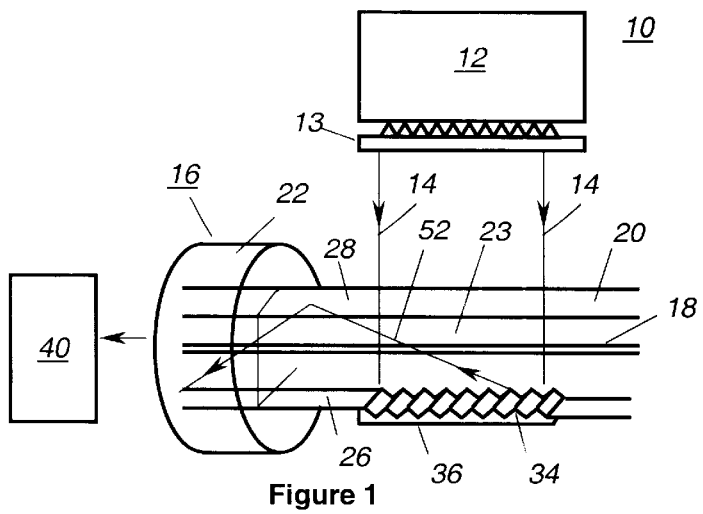
FIG. 1 is a diagrammatic perspective view of an apparatus for optically pumping an optical fiber from the side in accordance with the present invention.

Referring now to the drawings, and more particularly to FIG. 1 thereof, an apparatus for optically pumping an optical fiber from the side, generally identified by the numeral 10, is disclosed. The apparatus 10 includes a laser pump source 12 for providing a beam of pump light. In the preferred embodiment the laser pump source 12 is a semiconductor laser diode bar that provides an optical beam having a small range of a wavelengths centered around the absorption peak of the optical gain media to be pumped. Alternatively, other pump sources such as a multi transverse mode wide stripe laser diode or a multimode fiber pigtailed laser diode which delivers light from the output of a multimode fiber may be utilized. As will be described, this range of wavelengths will excite the dopant in the central core of an optical fiber and provide optical gain for either optical amplification or laser action. A lens 13 serves to collimate the pump light beam, generally illustrated by the numeral 14.

Figure 2:
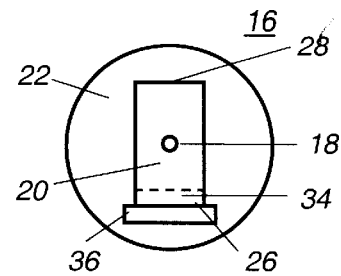
FIG. 2 is an end view of the apparatus illustrated in FIG. 1.

Also with reference to FIG. 2, an optical fiber, generally indicated by the numeral 16, is disposed in the path of the beam 14 and includes a central core 18, a multimode fiber 20 and an outer cladding layer 22 that surrounds the fiber 20. The outer cladding layer 22 is removed in the region proximate the pump beam 14. In such region the surrounding air provides the dielectric interface required for multimode guiding. Thus, in the region in the path of the beam 14 there is no outer layer around the multimode fiber 20.

The central core 18 comprises a rare earth dopant or dopants that can be optically excited by the pump light to provide optical gain for light confined to the core. As is well known, pump light propagating in the multimode region surrounding the core will interact with the doped core region to optically excite this gain media to enable amplification of the light confined to the core. In the preferred embodiment, the central core is co-doped with Ytterbium/Erbium and is pumped with a wavelength approximating 917 nm. As is well known, this wavelength excites the Ytterbium in the core which then transfers its energy to Erbium to provide an output optical gain at 1.55 $\mu$m.

The multimode fiber 20 is an elongated element that is characterized by an index of refraction $n_2$ and has a generally rectangular shape in cross-section (see FIG. 2) with a longitudinal segment 23 having flat opposed longitudinal surfaces 26 and 28. As is well known, the index of refraction and cross section dimensions support at lease one propagating mode characterized by a propagation angle and can support many additional modes with additional unique propagation angles. In the preferred embodiment the multimode fiber is a dual clad fiber manufactured by INO, of Canada, and having an index of refraction of approximately 1.45. As illustrated, its longitudinal flat surfaces 26 and 28 are disposed in the path of the pump beam 14.

Figure 3:
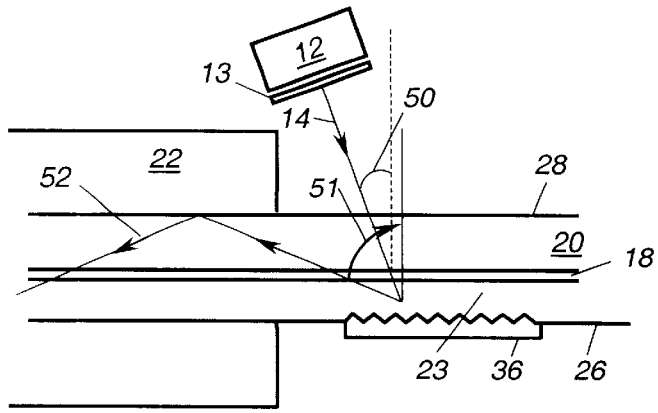
FIG. 3 is a schematic diagram illustrating the operation of the invention shown in FIG. 1.
Figure 4:
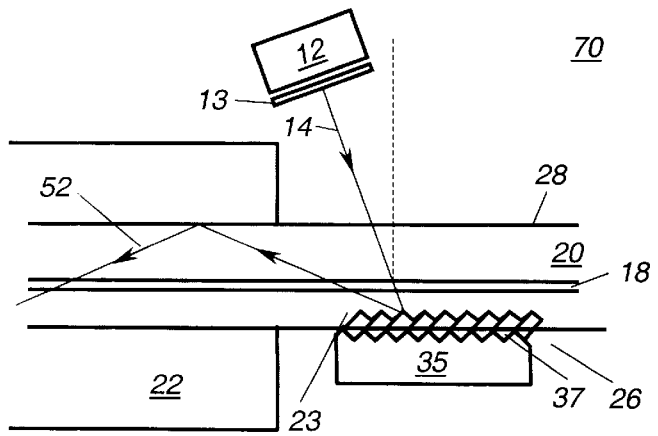
FIG. 4 is a schematic diagram of an alternative embodiment of an apparatus for optically pumping an optical fiber from the side in accordance with the present invention.
Figure 8:
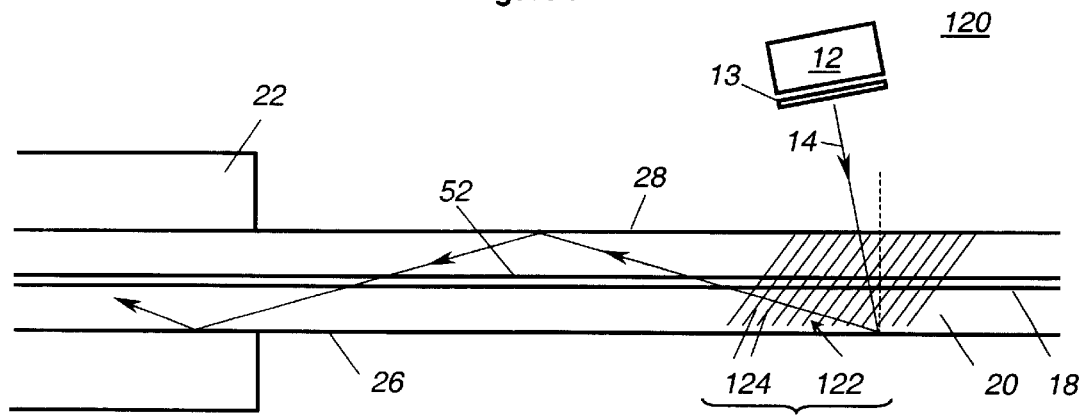
FIG. 8 is a schematic diagram of another embodiment of the present invention employing a volume grating formed inside the fiber.

A grating 34 is formed on the surface 26 and extends into the multimode fiber 20 (or subjacent the surface as shown in FIG. 4 or inside the fiber as shown in FIG. 8, both as will be described subsequently), and serves to Bragg diffract the pump beam 14. The grating 34 has a periodic sawtooth shape in front view (see FIG. 3) that provides a blazed corrugated relief pattern that is optimized for most efficient diffraction of the pump light wavelength at the angle that matches the propagation modes of the multimode fiber. By using a blazed, sawtooth grating profile, the grating 34 is more efficient in directing light into a particular diffraction order relative to other diffraction orders. The grating period $\Lambda$ (i.e. dimension of one sawtooth) is selected so that the diffraction angle matches the propagation mode of the multimode optical fiber 16. In the preferred embodiment the period $\Lambda$ is selected such that only one diffraction angle occurs and this angle matches the propagating mode of the multimode fiber 20. As will be described, the particular period dimensions determines the angle and direction that the pump beam is Bragg diffracted and the blazing of the corrugated relief pattern determines the efficiency with which this diffraction takes place.

The grating 34 is coated with a thin layer of reflective material 36, such as a metal, e.g. chrome, gold, silver, or aluminum. This reflective layer 36 increases the diffraction efficiency of the grating.

With reference now to FIG. 3, the matching condition occurs when the wavelength $\lambda$ of the pump beam 14, the period $\Lambda$, the Bragg diffraction angle $\theta$ (also shown by the numeral 51), the incident angle $\phi$ (also shown by the numeral 50 of the pump beam 14 passing through air) and the indexes of refraction for air $n_1$, and for the multimode fiber $n_2$ have the following relationship:

$$\Lambda n_1 \sin \phi + \Lambda n_2 \sin \theta = m\lambda,$$

where m is the Bragg diffraction order and generally is equal to 1 for best efficiency. Note that angles $\phi$ (i.e. 50) and $\theta$ (i.e. 51) are with respect to a normal from the surface 28.

It should be noted that the diffracted light is diffracted in a direction that places it on the same side as laser 12. Generally the incidence angle $\phi$ or 50 is a slight angle off normal incidence.

In operation, the laser pump source 12 generates the pump laser beam 14. The spectral spread of the pump laser beam creates several diffraction angles with each angle in the prescribed range corresponding to a propagating mode of the multimode fiber 20. The fact that there are many closely spaced angles that match to propagating modes of the multimode fiber is an advantage of the present invention in that the pump light is not required to be diffracted at only one angle in order to be successfully launched into a propagating mode. This condition is particularly helpful because the pump light is preferably produced from the laser diode bar which operates on a small range of wavelengths instead of merely producing a single wavelength. This small range of pump wavelengths diffracts off the grating 34 at slightly different angles and thus utilizes the small range of angles that can match to propagating modes in the multimode fiber 20.

More particularly, the multimode region of the fiber has an effective refractive index of approximately 1.45 and supports many modes of propagation at the pump wavelength. It is approximately 100 $\mu$m in thickness. The various modes supported by the multimode fiber allows the grating period to couple in a wavelength span of ±2 nm ranging around the pump wavelength, which accommodates a typical spectral response of pump lasers.

Accordingly, the incident pump light 14 approaches the surface 26 at an angle smaller than 90° and is Bragg diffracted at the angle $\theta$ along the path 52 in a direction toward the surface 28 at its boundary with the outer cladding layer 22. All such angles are within the total internal reflection condition for the interface between the multimode fiber 20 and the outer cladding 22 (or the air in the region where the outer cladding layer 22 has been removed).

The pump light matching the propagating mode in the multimode fiber 20 is conveyed to the region under the outer cladding layer 22 and continues to propagate down the remainder of the optical fiber 20. Typically the light propagation paths 52 run generally parallel to the longitudinal direction of the optical fiber. This allows the reflected and confined paths to bounce within the multimode fiber 20 as the light propagates into the region surrounded by the outer cladding layer 22. This propagating pump light interacts with the rare earth dopant in the core 18 and optically excites this dopant to provide optical gain. This excited dopant serves to optically amplify light that is confined to propagation just in the central core 18, in a manner well known in the art. The amplified light can be used to provide a fiber laser or a fiber amplifier, generally illustrated by the numeral 40 in FIG. 1.

In an alternative embodiment the grating is formed on the surface 28 and into the fiber closest to the pump laser source 12. In such configuration a metal reflecting layer 36 is not employed so that the pump beam is not shielded and thus is able to be diffracted by the grating formed by the periodic relief pattern which creates a periodic variation in the refractive index. In another alternative embodiment the cross section of the multimode fiber 20 is D-shaped. Other shapes are also possible as long as the longitudinal surface 26 of the fiber is ground flat to allow the grating relief pattern to be applied.

Figure 5:
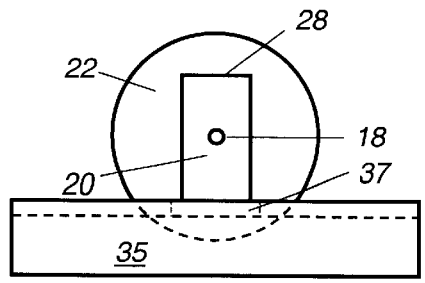
FIG. 5 is an end view of the apparatus illustrated in FIG. 4.

As shown in FIGS. 4 and 5 another alternative embodiment of the apparatus 70 for optically pumping an optical fiber from the side employs a commercially-available metallized blazed grating 35. Commercial gratings are generally wider than the cross section dimension of an optical fiber, and thus will extend out beyond the fiber as shown in FIG. 5. Many of the elements of the apparatus 70 are identical in construction to like elements in the apparatus 10 illustrated in FIG. 1, described above, and accordingly, there have been applied to each element of the apparatus 70 a reference numeral corresponding to the reference numeral that was applied to like elements of the apparatus 10. The grating 35 comprises a substrate, e.g. glass or quartz, that has a ruled sawtooth relief pattern with an intentional blaze angle and includes an integrated metal layer (not shown) such as chrome, gold, silver, aluminum or other reflective metal to improve the diffraction efficiency of the grating. It is located subjacent the multimode fiber 20 in the region where the outer cladding had been removed. A bonding material 37 having an index of refraction that matches the index of refraction of the multimode fiber at the pump wavelength and that is transparent to the pump light, such as UV curing glue, is then used to fill the gaps in the grooves of the sawtooth of the grating 35 to secure the grating on the longitudinal surface 26 of the multimode fiber 20. This grating coupler functions in exactly the same manner as described relative to the apparatus shown in FIG. 1. As described, the diffracted pump light 52 matches the propagating mode of the multimode fiber 20.

In this application the grating can be formed on the surface and into the fiber (FIG. 1) or on, subjacent or adjacent the surface (FIG. 4) or in the fiber (FIG. 8). Functionally, the grating serves the same purpose. Accordingly, the words "on" or "in" are interchangeable in meaning. For consistency, hereafter in the specification and the claims the word "on" will be used to describe the position of the grating relative to the surface of the multimode fiber.

Figure 6:
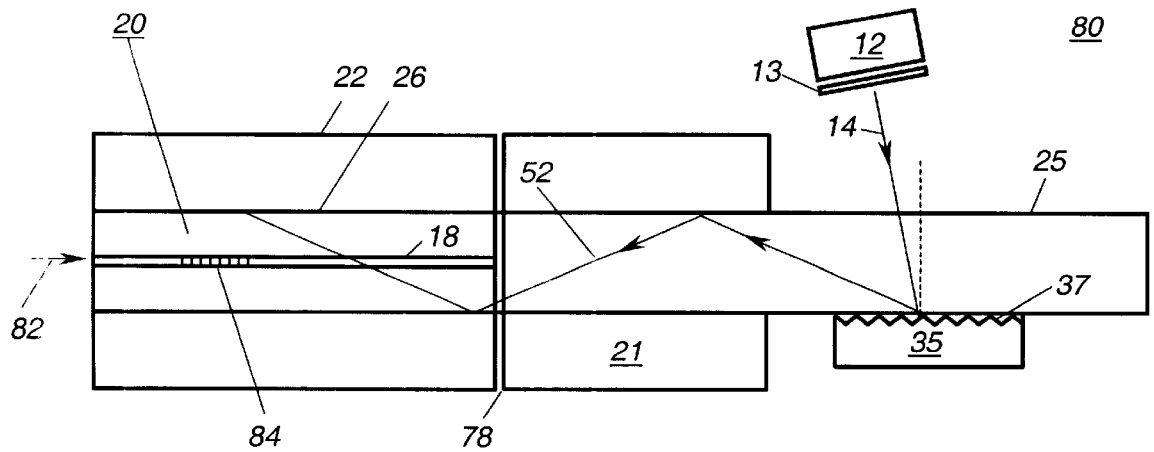
FIG. 6 is a schematic diagram illustrating coupling undoped multimode fiber to doped dual clad fiber in accordance with the present invention.

With reference now to FIG. 6 which depicts another side pumping apparatus 80, it should be recognized that it is possible to use an undoped multimode fiber 25 instead of a doped dual clad fiber. The undoped multimode fiber 25 has many modes of propagation on which the pump light can be coupled in an identical manner to that provided by the cladding region of the doped dual clad fiber. In apparatus 80 the undoped multimode fiber 25 is end coupled to the dual clad fiber 20 to allow the pump light 14 that was grating coupled into the multimode fiber to be launched (via path 52) into the dual cladding region of the doped dual clad fiber 20. This enables optical pumping of a fiber laser or fiber amplifier. The end coupled geometry is shown in FIG. 6 where the commercial grating 35 described above and including the bonding material 37 diffract the pump light 14 and couple it into the propagating modes of the multimode fiber 25 which in turn, is end coupled, via fusion splice 78, to the dual clad doped fiber 20. In this application the light 82 in the core 18 of the doped fiber 26, which is to become optically amplified, is introduced into the other end of the doped fiber 20. A Bragg retroreflection grating, illustrated by the vertical lines 84, located in the core 18 near to the fusion splice 78 reflects the light that is to be amplified as it approaches the fusion splice 78 and directs this light back along the core 18 where it can be optically amplified by the pump light coupled across the fusion splice 78.

Figure 7:
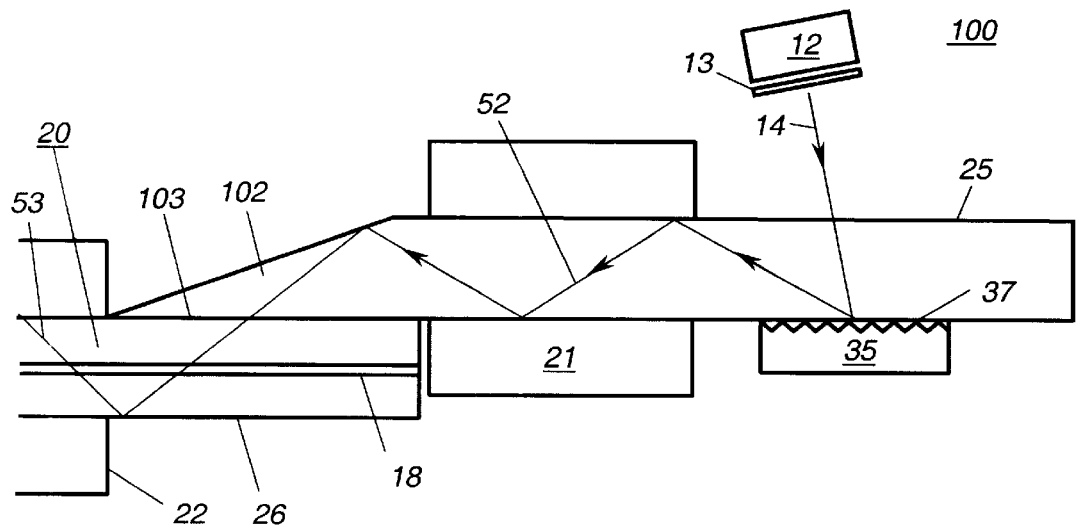
FIG. 7 is a schematic diagram illustrating coupling undoped multimode fiber to doped dual clad fiber with a tapered fusion coupler in accordance with the present invention.

With reference to FIG. 7, an alternative embodiment of the side pumping apparatus 100 is illustrated in which the multimode fiber 25 is coupled to the dual clad fiber for the purpose of optical pumping. This employs a tapered fusion coupler as is known in the art. Many of the elements of the apparatus 100 are identical in construction to like elements of in the apparatus illustrated in FIG. 6 and described above. Accordingly, there have been applied to each element of the apparatus 100, a reference numeral corresponding to the reference numeral that was applied to like element of the apparatus 80. In this embodiment, an end 102 of the multimode fiber 25 is tapered in diameter and fused at its interface 103 to the dual clad fiber 20. The outer cladding 22 of the dual clad fiber 20 is removed in the region of the tapered end 102, as is the cladding 21 of multimode fiber 25. Hence, the light 52 in the multimode fiber 25 that has been diffracted and coupled in by the grating 35 and the bonding material 37 is transferred to the cladding layer of the dual clad fiber. With this approach many multimode fibers can transfer their pump light into the cladding layer of the same dual clad fiber. The approach also gives access to both ends of the dual clad fiber allowing straight forward application to fiber amplifier and fiber laser applications.

Another alternative embodiment of the side pumping apparatus 120 is shown in FIG. 8. The apparatus 120 differs from the apparatus 10 illustrated in FIG. 1 in that the grating coupler comprises a grating 122 having a periodic variation of its refractive index formed inside the volume or the cladding region of the fiber. As illustrated, grating 122 within the longitudinal segment 23 of the multimode portion 20 of the dual clad fiber, comprises a plurality of planes 124 that have a slightly different refractive index than the index of multimode portion 20 of the dual clad fiber. These parallel planes of varying refractive index are slanted relative to the longitudinal surfaces 26 and 28. The grating planes 124 are separated by uniform distances that constitute the period of the grating. The period of the grating planes 124 is selected to side couple the pump light. The relationship that determines this period is the same as that previously described with reference to FIG. 3, only in this case the period $\Lambda$ is the spacing distance of planes of varying refractive index as measured along the longitudinal dimension of the fiber. The slanted configuration serves to increase the input coupling efficiency. The grating 122 acts as a bulk volume grating and diffracts the laser pump beam 14 into the propagating mode. Such gratings are made using holographic exposure from UV laser light, in a manner known in the art.

In operation the pump beam 14 is launched against the side of an optical fiber 20, which can be multimode or doped dual clad fiber, in a direction generally transverse to the modes of propagation along the length of the fiber. The fiber grating 122 causes the diffracted pump light to couple into the propagation modes illustrated by the path 52 within the longitudinal segment 23 of the optical fiber 20 where the light can either optically pump the active medium of the doped fiber or be coupled from the multimode fiber to an optical medium with gain. Since the fiber grating 122 comprises a plurality of grating planes 124 it exhibits a periodic variation of the refractive index when sampled along the longitudinal dimension of the fiber. Moreover, since the grating planes 124 are slanted, coupling efficiency is improved. This is analogous to the effect achieved by the blazing technique used for relief gratings. The grating 122 Bragg diffracts the light beam 14 incident from the side of the fiber into a mode of propagation along the longitudinal length of the fiber when the light has the appropriate wavelength and incident angle.

Figure 9:
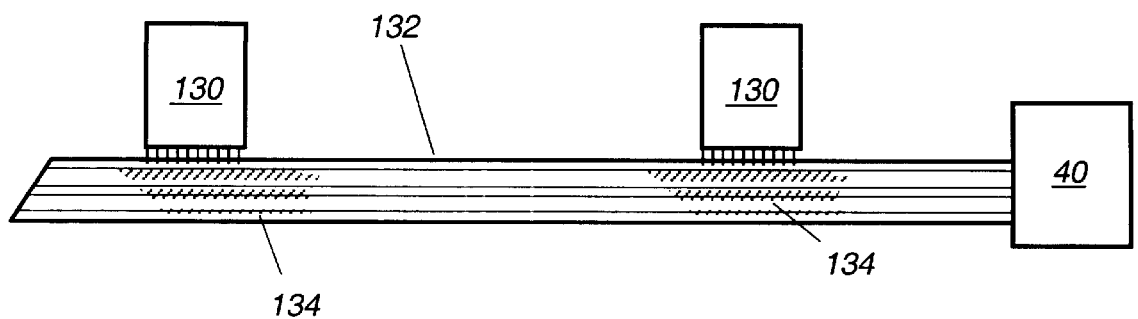
FIG. 9 is a schematic diagram of another embodiment of the present invention employing a plurality of pump sources.

As illustrated in another alternative embodiment shown in FIG. 9, many laser pump sources 130 can be employed along the length of the optical fiber 132. The positions of the sources 130 are selected such that the distances between their associated gratings 134 minimizes coupling pump light already propagating in the optical fiber outside the optical fiber 132, which output coupled light constitutes a loss. With properly positioned laser pump sources 130, substantially all the pump light is absorbed before reaching the adjacent grating. As has been described the gratings 134 are blazed or slanted to increase the input coupling efficiency. This blazing or slanting introduces an additional benefit in that the output coupling efficiency of the grating is reduced for light already propagating in the optical fiber that approaches from the prior grating input coupler. Accordingly, the output coupled light is reduced by the blazing or slanting, and hence the loss is minimized. Thus, the gratings can be positioned closer together, thereby increasing the input coupled pump power.

Where significant separation exists between the gratings the resulting unpumped stretches of dual clad fiber is accommodated by forming the active medium from a 4-level gain media system. This prevents amplified light from being absorbed by unpumped regions and allows a large number of gratings to be positioned along the fiber without compromise to the light that is to be amplified by the doped fiber. Examples of 4-state systems are a neodymium (Nd) doped silica fiber when pumped at 807 nm to provide optical gain at 1060 nm or a Ytterbium doped fiber when pumped at 917 nm to provide optical gain at 1117 nm.

Figure 10:
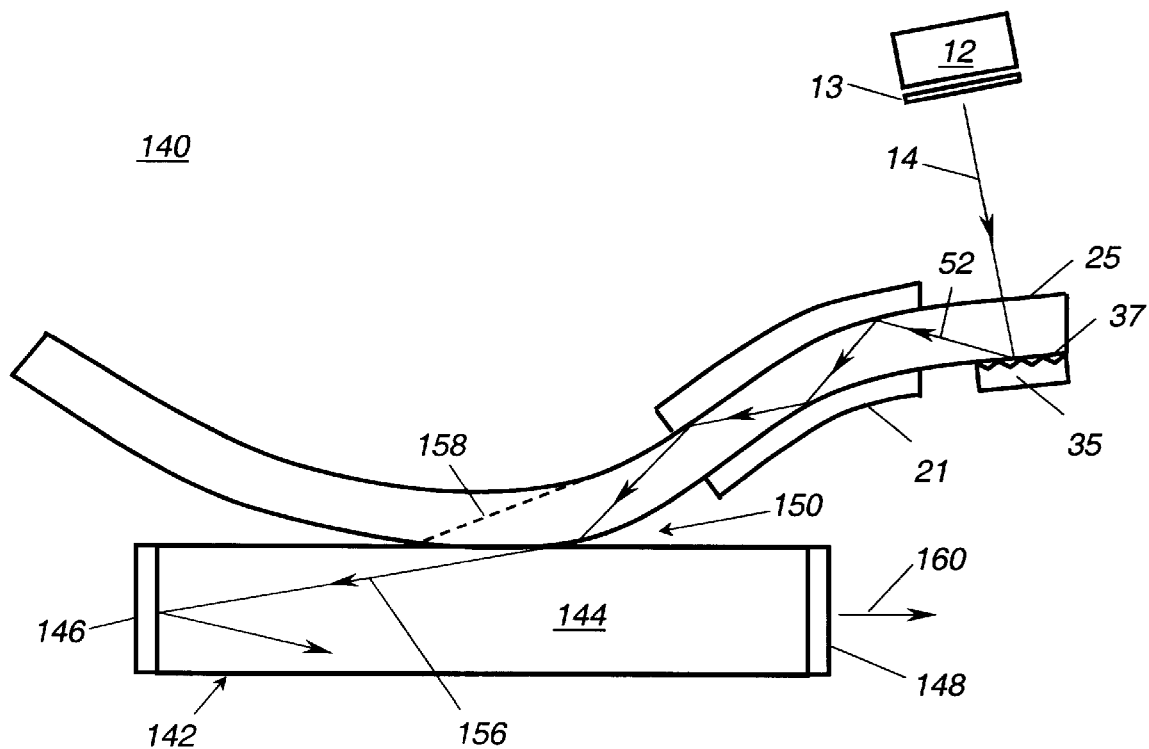
FIG. 10 is a schematic diagram of yet another embodiment of the present invention employing leaky wave coupling to a solid state laser rod.

In yet another alternative embodiment illustrated in FIG. 10, the side pumping apparatus 140 employs leaky wave pumping of the active medium of a solid state laser 142 to couple light into a multimode fiber 25 via the grating 35 in accordance with known techniques. As illustrated, the solid state laser 142 comprises a laser rod 144 having a relativity high index of refraction and including mirrors 146 and 148 configured to create a cavity with a resonant mode therein. The multimode fiber 25 is placed against or adjacent to the laser rod 144 in the region 150 where the cladding has been removed from the multimode fiber 25. Thus, the pump light has access to and is generally parallel to the resonant mode that is formed by the mirrors 148 and 150. When the pump light 14 from the source 12 is conveyed into the multimode fiber 25 by the grating coupler comprising the grating 35 and the bonding material 37 and propagated to the region 150, it leaky wave couples into the laser rod 144 to excite this gain medium.

In a manner known in the art pump light thus leaks out of the low index of refraction multimode fiber 25 into the solid state laser 142 and propagates largely in the longitudinal direction 156. The leaky wave coupling can be scaled to generate high pump power by a attaching a large number of fibers to the laser. Redundant fibers improve reliability. Also, the length of the coupling section is chosen to optimize the pump light transfer. A tapered pump fiber along the area of contact (in a manner similar to that shown in FIG. 7 and denoted in FIG. 10 by dashed lines and designated by the numeral 158), enhances the coupling by bringing low order leaky modes to the surface where they interact with the high index of refraction material comprising the laser rod 144. The cavity formed by the mirrors 146 and 148 around the solid state rod 144 emits the lasing light 160. This same leaky wave approach utilizing grating coupling can also be used to pump solid state amplifiers or even doped fiber systems.

It will be appreciated by persons skilled in the art that the present invention is not limited to what has been shown and described hereinabove. The scope of the invention is limited solely by the claims which follow.

What is claimed is:

1. An apparatus for optically pumping an optical fiber from the side comprising:
   a laser for supplying a free space beam of pump light;
   an optical fiber having a longitudinal segment with at least one propagating mode characterized by a propagation angle; and
   a grating with periodicity disposed on a portion of the longitudinal segment for diffracting said pump light beam at a predetermined angle that is matched to said propagation angle.

2. An apparatus for optically pumping an optical fiber from the side comprising:
   a laser for supplying a beam of pump light;
   an optical fiber having a longitudinal segment including a longitudinal surface that is disposed away from said laser with at least one propagating mode characterized by a propagation angle; and
   a grating with periodicity disposed on a portion of the longitudinal segment for diffracting said pump light beam at a predetermined angle that is matched to said propagation angle.

3. The apparatus as set forth in claim 2, wherein said longitudinal surface is flat.

4. The apparatus as set forth in claim 2, wherein said grating comprises a corrugated relief pattern on said longitudinal surface.

5. The apparatus as set forth in claim 2, and further comprising a layer formed from a reflective material disposed over said grating for reflecting said beam of pump light.

6. The apparatus as set forth in claim 4, wherein said reflective material comprises a metal.

7. The apparatus as set forth in claim 2, wherein said grating has a sawtooth profile.

8. An apparatus for optically pumping an optical fiber from the side comprising:
   a laser for supplying a free space beam of pump light having a wavelength $\lambda$ through a medium having an index of refraction $n_1$;
   an optical fiber having an index refraction $n_2$ and a longitudinal surface and with at least one propagating mode characterized by a propagation angle $\theta$, said laser forming an incident angle $\phi$ with the line passing normally to the optical fiber; and
   a grating having a period $\Lambda$ disposed on a portion of the longitudinal surface for diffracting said beam at the angle $\theta$ that is matched to said propagation angle.

9. An apparatus for optically pumping an optical fiber from the side comprising:
   a plurality of lasers each supplying a free space beam of pump light;
   an optical fiber having a longitudinal surface and with at least one propagating mode characterized by a propagation angle; and
   a plurality of gratings formed on said longitudinal surface for diffracting a respective one of said beams at a predetermined angle, said predetermined angles being matched to said propagation angle.

10. An apparatus for optically pumping an optical fiber from the side comprising:
   a laser for supplying a beam of pump light;
   an optical fiber having a rectangular cross section and a longitudinal segment with at least one propagating mode characterized by a propagation angle; and
   a grating with periodicity disposed on a portion of the longitudinal segment for diffracting said pump light beam at a predetermined angle that is matched to said propagation angle.

11. An apparatus for optically pumping an optical fiber from the side comprising:
   a laser for supplying a beam of pump light;
   an optical fiber having a D-shaped cross section and longitudinal segment with at least one propagating mode characterized by a propagation angle; and
   a grating with periodicity disposed on a portion of the longitudinal segment for diffracting said pump light beam at a predetermined angle that is matched to said propagation angle.

12. An apparatus for optically pumping an optical fiber from the side comprising:
   a laser for supplying a beam of pump light;
   an optical fiber having a longitudinal segment with at least one propagating mode characterized by a propagation angle;
   a grating with periodicity disposed on a portion of the longitudinal segment for diffracting said pump light beam at a predetermined angle that is matched to said propagation angle; and
   a bonding material for securing said grating to said longitudinal segment, said bonding material having an index of refraction that is substantially equal to that of said optical fiber.

13. An apparatus for optically pumping an optical fiber from the side comprising:
   a laser for supplying a beam of pump light;
   an optical fiber having a longitudinal segment with at least one propagating mode characterized by a propagation angle; and
   a grating having a reflective index that varies periodically disposed on a portion of the longitudinal segment for diffracting said pump light beam at a predetermined angle that is matched to said propagation angle.

14. The apparatus as set forth in claim 13, wherein said grating comprises a plurality of parallel planes that are angularly disposed relative to the longitudinal segment, and wherein the refractive index of said parallel planes varies to enhance input coupling efficiency.

15. An apparatus for optically pumping an optical fiber from the side comprising:
   a laser for supplying a beam of pump light;
   an optical multimode fiber having a longitudinal segment with at least one propagating mode characterized by a propagation angle; and
   a grating with periodicity disposed on a portion of the longitudinal segment for diffracting said pump light beam at a predetermined angle that is matched to said propagation angle.

16. The apparatus as set forth in claim 15, and further comprising means for coupling said multimode fiber to a dual clad fiber.

17. The apparatus as set forth in claim 16, wherein said means for coupling comprises a fusion splice.

18. The apparatus as set forth in claim 16, wherein the end of said multimode fiber toward said dual clad fiber is tapered and forms an interface with the outer longitudinal surface of said dual clad fiber.

19. The apparatus as set forth in claim 15, and further comprising a laser having means forming a resonant cavity and formed of a material having a higher index of refraction than that associated with said multimode fiber, said multimode fiber disposed against the said laser, whereby pump light flowing through said multimode fiber leaks into said laser.

20. The apparatus as set forth in claim 19, wherein a portion of said multimode fiber against laser is tapered to enhance said leakage.

21. An apparatus for optically pumping an optical fiber from the side comprising:
   a semiconductor laser bar for supplying a beam of pump light;
   an optical fiber having a longitudinal segment with at least one propagating mode characterized by a propagation angle; and
   a grating with periodicity disposed on a portion of the longitudinal segment for diffracting said pump light beam at a predetermined angle that is matched to said propagation angle.

22. An apparatus for optically pumping an optical fiber from the side comprising:
   a laser for supplying a beam of pump light;
   an optical fiber including a central core comprising a rare earth dopant material and having a longitudinal segment with at least one propagating mode characterized by a propagation angle; and
   a grating with periodicity disposed on a portion of the longitudinal segment for diffracting said pump light beam at a predetermined angle that is matched to said propagation angle.

23. An apparatus for optically pumping an optical fiber from the side comprising:
   a laser for supplying a beam of pump light having a wavelength $\lambda$ through a medium having an index of refraction $n_1$;
   an optical fiber having an index refraction $n_2$ and a longitudinal surface and with at least one propagating mode characterized by a propagation angle $\phi$ with the line passing normally to the optical fiber; and
   a grating having a period $\theta$, said laser forming an incident angle $\phi$ with the line passing normally to the optical fiber; and
   a grating having a period $\Lambda$ disposed on a portion of the longitudinal surface for diffracting said beam at the angle $\theta$ that is matched to said propagation angle, wherein $$\Lambda n_1 \sin \phi + \Lambda n_2 \sin \theta = m\lambda,$$

where m is the Bragg diffraction order.

24. An apparatus for optically pumping an optical fiber from the side comprising:
   a plurality of lasers each supplying a beam of pump light;
   an optical fiber having a longitudinal surface and with at least one propagating mode characterized by a propagation angle; and
   a plurality of gratings formed on said longitudinal surface for diffracting a respective one of said beams at a predetermined angle, said predetermined angles being matched to said propagation angle, wherein said gratings are separated by a distance such that pump light propagating in said optical fiber is absorbed before reaching an adjacent grating.

25. An apparatus for optically pumping an optical fiber from the side comprising:

a plurality of lasers each supplying a beam of pump light;

an optical fiber having a longitudinal surface and with at least one propagating mode characterized by a propagation angle; and a plurality of gratings formed on said longitudinal surface for diffracting a respective one of said beams at a predetermined angle, said predetermined angles being matched to said propagation angle, said gratings being blazed so as to enhance input coupling efficiency.

26. The apparatus as set forth in claim 18, wherein said gratings are separated by a distance such that pump light propagating in said optical fiber is not absorbed before reaching an adjacent grating and said blaze reduces output coupling loss.

* * * * *